(12) United States Patent
Kato et al.

(10) Patent No.: US 8,272,984 B2
(45) Date of Patent: Sep. 25, 2012

(54) ENDLESS METAL BELT

(75) Inventors: Koji Kato, Anjo (JP); Masashi Hattori, Anjo (JP); Yasuhiro Takeuchi, Anjo (JP); Hideharu Ushida, Anjo (JP); Masaki Saito, Anjo (JP); Katsumori Fujii, Anjo (JP); Shinichiro Yajima, Toyota (JP); Koichi Tanaka, Toyota (JP); Hirofumi Nozawa, Toyota (JP); Keisuke Ninomiya, Toyota (JP); Satoru Ando, Toyota (JP); Yuji Hattori, Toyota (JP); Tomohito Suzuki, Tahara (JP); Miyoshi Kakiuchi, Tahara (JP); Toshiaki Oomori, Tahara (JP); Kazuhiro Hanaki, Tahara (JP); Keiichiro Irie, Tahara (JP)

(73) Assignees: Aisin AW Co., Ltd., Aichi (JP); Toyota Jodosha Kabushiki Kaisha, Aichi (JP); CVTC Co., Ltd, Aichi (JP)

( * ) Notice: Subject to any disclaimer, the term of this patent is extended or adjusted under 35 U.S.C. 154(b) by 150 days.

(21) Appl. No.: 12/677,980

(22) PCT Filed: Sep. 30, 2008

(86) PCT No.: PCT/JP2008/067772
§ 371 (c)(1),
(2), (4) Date: Mar. 12, 2010

(87) PCT Pub. No.: WO2009/066512
PCT Pub. Date: May 28, 2009

(65) Prior Publication Data
US 2010/0227721 A1    Sep. 9, 2010

(30) Foreign Application Priority Data

Nov. 20, 2007  (JP) .................................. 2007-300886

(51) Int. Cl.
*F16G 5/16*    (2006.01)
(52) U.S. Cl. .................................................... 474/242
(58) Field of Classification Search .................. 474/240, 474/242, 245, 250, 255
See application file for complete search history.

(56) References Cited

U.S. PATENT DOCUMENTS 5,263,904 A    11/1993   Van Liempd
(Continued)

FOREIGN PATENT DOCUMENTS

EP    0 522 612 A2    1/1993
(Continued)

OTHER PUBLICATIONS

European Search Report dated Sep. 5, 2011 for corresponding European Application No. 08851886.5.

*Primary Examiner* — Michael Mansen
*Assistant Examiner* — Mark K Buse
(74) *Attorney, Agent, or Firm* — Sughrue Mion, PLLC

(57) ABSTRACT

An endless metal belt including a ring formed by laminating endless metal plates; and multiple elements continuously attached to the ring. Each of the elements has a body, a head connected to the body by a pillar, and slots formed between the body and the head on left and right sides of the pillar, respectively, for receiving the ring. The elements satisfy the equations (h/t)<1 and (S/h)>40, where h is a width of the slots, t is a plate thickness of the elements, and S is an area of the head.

6 Claims, 17 Drawing Sheets

U.S. PATENT DOCUMENTS

| | | | |
|---|---|---|---|
| 6,110,065 A * | 8/2000 | Yagasaki et al. | 474/244 |
| 6,440,025 B1 * | 8/2002 | Ohnuki | 474/242 |
| 2002/0045505 A1 * | 4/2002 | Yoshida et al. | 474/245 |
| 2002/0128104 A1 * | 9/2002 | Koyama | 474/242 |
| 2003/0040387 A1 * | 2/2003 | Kanehara | 474/242 |
| 2003/0050142 A1 * | 3/2003 | Akagi et al. | 474/242 |
| 2006/0079361 A1 | 4/2006 | Ueda et al. | |
| 2008/0009378 A1 * | 1/2008 | Kanehara et al. | 474/242 |
| 2008/0305906 A1 * | 12/2008 | Kobayashi | 474/242 |
| 2010/0227721 A1 * | 9/2010 | Kato et al. | 474/242 |

FOREIGN PATENT DOCUMENTS

| | | |
|---|---|---|
| EP | 1018808 A1 | 7/2000 |
| EP | 1424508 A2 | 6/2004 |
| JP | 11-108122 A | 4/1999 |
| JP | 2000-055136 A | 2/2000 |
| JP | 2003-329088 A | 11/2003 |
| JP | 2005-028415 A | 2/2005 |
| JP | 2006-112485 A | 4/2006 |
| JP | 2007-192254 A | 8/2007 |
| WO | WO 2007-069883 A1 | 6/2007 |

* cited by examiner

FIG. 3A

| | 9 LAYERS | 6 LAYERS | | | | |
|---|---|---|---|---|---|---|
| | | A: SLOT WIDTH REDUCED (HEAD POSITION OFFSET) | B: HEAD THICKNESS INCREASED (DH POSITION NOT CHANGED) | C: B + EAR PART LOWER R ENLARGED | D: B + EAR LENGTH REDUCED | E: B + EAR LOWER PART R ENLARGED + EAR LENGTH REDUCED |
| | | 0.555 mm | 0.555 mm | 7a 7 7a | 16.7mm | 17.3mm |
| SLOT WIDTH (mm) | 1.822 | 1.267 | ← | ← | ← | ← |
| EAR LOWER PART R (mm) | 0.55 | ← | ← | 0.82 | 0.55 | 0.83 |
| EAR LENGTH (mm) | 17.7 | ← | ← | ← | 16.7 | 17.3 |
| RING PRESSING AMOUNT Min (mm) ※1 | 5.345(>4.875) | 5.39 | 5.39 | 5.124 | 4.888 | 4.913 |
| DIE STRESS (MPa) | 475 | 725(+53%) | 669(+41%) | — | 606(+28%) | 554(+16%) |

※1 AT LEAST HALF (4.875 mm) OF THE PLATE WIDTH SHOULD BE PRESSED

FIG. 3B

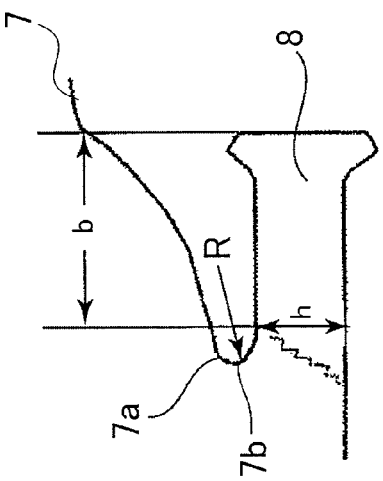

| | ELEMENT TYPE | h: SLOT WIDTH | t: PLATE THICKNESS | S: HEAD AREA | b: EAR LENGTH | h/t | b/h | S/h | DIE STRESS (MPa) | RESULT |
|---|---|---|---|---|---|---|---|---|---|---|
| (1) | 24/6 B | 1.267 | 1.4 | 60.5 | 6.4 | 0.91 | 5.1 | 47.7 | 669 | ○ |
| (2) | 24/6 E | 1.267 | 1.4 | 59.3 | 5.9 | 0.91 | 4.7 | 46.8 | 554 | ◎ |
| (3) | 24/6 A | 1.267 | 1.4 | 50.5 | 6.4 | 0.91 | 5.1 | 39.8 | 725 | × |
| (4) | VDT 24/9 | 1.822 | 1.4 | 50.5 | 6.4 | 1.30 | 3.5 | 27.7 | 475 | ◎ |
| (5) | VDT 24/12 | 2.45 | 1.4 | 50.5 | 6.4 | 1.75 | 2.6 | 20.6 | – | ◎ |
| (6) | HONDA 24/12A | 2.65 | 1.5 | 73.8 | 8.8 | 1.77 | 3.3 | 27.9 | – | ◎ |
| (7) | HONDA 24/12B | 2.45 | 1.5 | 59.6 | 6.5 | 1.63 | 2.7 | 24.3 | – | ◎ |
| (8) | 30/6 B | 1.345 | 1.65 | 83.6 | 7.9 | 0.82 | 5.9 | 62.2 | – | ◎ |
| (9) | 30/6 A | 1.345 | 1.65 | 72.0 | 7.9 | 0.82 | 5.9 | 53.5 | – | ○ |
| (10) | VDT 30/9 | 1.9 | 1.65 | 72.0 | 7.9 | 1.15 | 4.2 | 37.9 | – | ◎ |
| (11) | VDT 30/12 | 2.6 | 1.65 | 72.0 | 7.9 | 1.58 | 3.0 | 27.7 | – | ◎ |

PLATE THICKNESS
DIFFERENCE BETWEEN
UPPER AND LOWER PARTS : $\dfrac{(a+b)}{2} - \dfrac{(c+d)}{2}$ (+: HEAD IS THICK, −: HEAD IS THIN)

ENDLESS METAL BELT

INCORPORATION BY REFERENCE

The disclosure of Japanese Patent Application No. 2007-300886 filed on Nov. 20, 2007, including the specification, drawings and abstract is incorporated herein by reference in its entirety.

BACKGROUND OF THE INVENTION

The present invention relates to endless metal belts for use in belt-type continuously variable transmission apparatuses, and more particularly, to the shape of elements in a push-type endless metal belt that is formed by a ring, which is formed by laminating a plurality of endless metal plates (metal strips), and a multiplicity of elements (V-blocks), which are continuously attached to the ring.

DESCRIPTION OF THE RELATED ART

In general, an endless metal belt is wound between a primary pulley and a secondary pulley. Power transmitting rotation speed is continuously varied by changing an effective diameter by axially moving movable sheaves of the pulleys. As shown in FIG. 1, an endless metal belt 1 is formed by a ring 2, which is formed by laminating endless metal plates 4 . . . , and a multiplicity of elements (V-blocks) 3, which are continuously attached to the ring 2, and these elements are continuously formed with an endless shape. As shown in detail in FIGS. 2A and 2B, each element 3 is made of a steel plate having a predetermined thickness, and is formed by a body 5 and a head 7. The body 5 has V-shaped left and right flanks 5a to be in contact with the pulleys, and the head 7 is connected to the body by a pillar 6. Portions (slots) 8 between the body 5 and the head 7 located on the left and right sides of the pillar 6, respectively, are saddles 9 for receiving the ring 2. Moreover, grooves 5c for allowing a lubricant to flow therein are formed on the left and right flanks 5a, which are the left and right side surfaces of the body 5. A dimple D is formed on one surface of the head 7, and a hole H is formed on the other surface thereof, in order to maintain a posture of each block. Portions extending on the left and right sides of the head to form the slots 8, respectively, are referred to as ears 7a, 7a (see Japanese Patent Application Publication Nos. JP-A-H11-108122 and JP-A-2006-112485).

The elements 3 are formed by punching a strip-shaped steel plate of a predetermined thickness by, e.g., fine blanking, and the ring 2 is formed with an endless shape by butt jointing strip-shaped steel plates under precise control, and thus, accurately laminating a plurality of endless metal plates (metal strips) 4. The ring 2 is structured so as to retain a predetermined tensile strength and flexibility.

SUMMARY OF THE INVENTION

Conventionally, in the endless metal belt 1, the ring 2 is fitted in the left and right slots 8 of the elements 3 to put the multiplicity of elements 3 . . . together so that the elements 3 are not separated from each other. The ring 2 is formed by a relatively large number of layers, e.g., nine endless metal plates 4.

The ring 2 is formed by the endless metal plates (the metal strips) 4 . . . that are formed under precise control so as to accurately closely contact each other. Since the ring 2 is formed by a multiplicity of layers (the endless metal plates), the ring 2 is relatively expensive, which increases the cost of the endless metal belt 1, and thus, the cost of belt-type continuously variable transmissions using the endless metal belt 1.

The inventors conducted research and development to reduce the cost by reducing the number of layers (the number of endless metal plates) of the ring. As a result, the inventors found that, when the width h of the slots 8 of the elements 3 is reduced in conjunction with the reduction in the number of ring layers, a die stress generated when forming the elements sharply increases, which hinders formation of accurate elements. The inventors analyzed the relation between the die stress and the shape of the elements, and also analyzed the shapes and functions of the elements.

It is an object of the present invention to provide an endless metal belt that is capable of reducing the cost by reducing the number of ring layers, and at the same time solves the above problem by specifying the shape limit of elements which ensures high productivity and sufficient functions as a belt.

An endless metal belt according to the present invention includes: a ring formed by laminating a plurality of endless metal plates; and a multiplicity of elements continuously attached to the ring, and is characterized in that each of the elements has a body, a head connected to the body by a pillar, and slots formed between the body and the head on left and right sides of the pillar, respectively, for receiving the ring, and the elements satisfy $(h/t)<1$ and $(S/h)>40$ mm, where h is a width of the slots, t is a plate thickness of the elements, and S is an area of the head.

Thus, even if an element has a slot width smaller than the plate thickness, such as an element having a small slot width for, e.g., 6-layer rings, increasing the head area to a value equal to or larger than 40 times the slot width reduces a hydrostatic pressure applied in a punching process, and thus, reduces a load on a die. This reduces disadvantages in a production process, such as generation of die cracks, whereby accurate elements can be produced efficiently.

Preferably, the elements further satisfy $(S/h)>17.058$ mm·$(b/h)-46.676$ mm, where b is an ear length of the head, which corresponds to a length of a part of the slot which can contact the ring.

This reliably further reduces the load on the die, and also reduces rolling and the like of the elements, whereby the functions of the endless metal belt can be ensured.

Moreover, the elements further satisfy $(S/h)<25.494$ mm·$(b/h)-53.344$ mm, where b is an ear length of the head, which corresponds to a length of a part of the slot which can contact the ring.

This defines raising of the center of gravity of the elements due to an increase in head area, and reduces pitching and the like of the elements, whereby the functions of the endless belt can be ensured.

The ear length (b) is at least half of a width of the ring.

As the ear length is reduced, a contact width with the ring decreases, and a surface pressure increases, thereby reducing durability, and increasing the rolling amount of the elements. However, using the ear length of at least half of the ring width ensures durability, and regulates the rolling amount of the elements, whereby the functions of the endless metal belt can be ensured.

The elements have a width on a pitch line of 24 [mm], and the ring is formed by laminating six endless metal plates.

The use of such an endless metal belt improves productivity of the elements, and enables the endless metal belt to smoothly and reliably transmit predetermined power as an endless metal belt for continuously variable transmissions.

Preferably, in the endless metal belt, the elements are combined and attached to the ring so that a sum of the elements in a linear portion becomes such that a plate thickness of the head becomes larger than a plate thickness of an upper part of the body.

The elements are arranged so that the plate thickness of the head becomes larger than the plate thickness of the upper part of the body in the linear portion. Thus, the elements are aligned especially on the compression side, whereby generation of noise can be reduced.

BRIEF DESCRIPTION OF THE DRAWINGS

FIG. 3A is a table showing various elements, and FIG. 3B is a diagram showing the ear length and the slot width thereof;

DETAILED DESCRIPTION OF THE EMBODIMENTS

Figure 1:
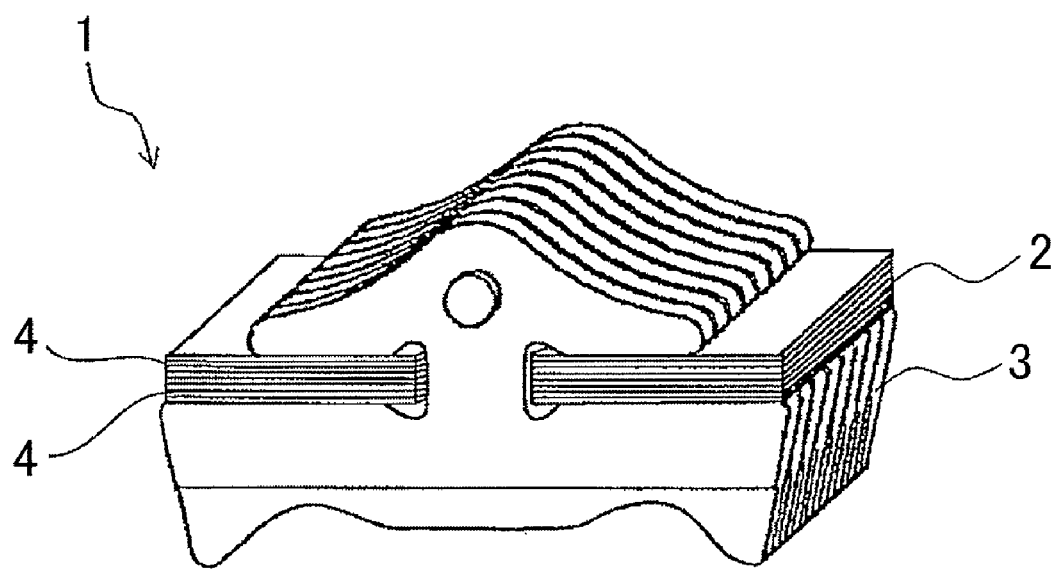
FIG. 1 is a perspective view showing a part of an endless metal belt to which the present invention can be applied.

In the present invention, it was analyzed that, for continuously variable transmissions (CVT) of 150 [Nm] or less, 6-layer rings formed by six endless metal plates 4 are sufficiently acceptable in terms of the strength. This analysis led to the conclusion that, since the number of endless metal plates of the ring is reduced from nine to six, a total of six endless metal plates can be saved for the right and left parts of the ring, whereby the cost can be significantly reduced. First, elements prototyped by the inventors will be described with reference to FIGS. 3A to 3B. These elements were prototyped in order to obtain the shape of an element 3 that is adapted to a six-layer ring 2 formed by six endless metal plates (metal strips) 4. In FIG. 3A, "9 layers" shows an element adapted to a conventional 9-layer ring formed by nine endless metal plates. "A" shows an element having the same shape as that of the 9-layer element, except that the position of the head 7 is offset toward the body 5 with respect to the 9-layer element so that the width of the slots 8 is adapted to a 6-layer ring. Thus, only the slot width "h" is smaller than the 9-layer element. Note that the gap between the ring 2 and the ear 7a is 0.1 mm as in the case of the 9-layer ring, and the position of the head 7 is offset by an amount corresponding to the thickness of three endless metal plates (0.555 [mm]). "B" shows an element that is the same as the element A in that the slot width is reduced so as to be adapted to the 6-layer ring, but is different from the element A in that the height (the thickness) of the head 7 is increased by an amount corresponding to the reduction in slot width, so that the element B has a height similar to that of the 9-layer element. In the element B, the position of the dimple D and the hole H (the DH position) is the same as that of the 9-layer element.

"C" indicates an element having the same shape as that the element B except that the R-shape in the lower part of a tip end 7b of each of the left and right ears 7a, 7a of the head 7 is enlarged (from 0.55 to 0.82). That is, as shown in FIG. 3B, enlarging the R-shape in the lower part of the tip end 7b of the ear 7a reduces the length of an end in contact with the ring 2 accordingly, whereby an amount "b" by which the ring is pressed (hereinafter referred to as the "ring pressing amount") is reduced (from 5.39 to 5.124). "D" indicates an element having the same shape as that of the element B except that the ear length "b" is reduced (from 17.7 to 16.7). Thus, the ring pressing amount is also reduced (from 5.39 to 4.888).

"E" indicates an element having the same shape as that of the element B except that the lower part R is enlarged (which is the structure of C), and the ear length is reduced as compared to the conventional 9-layer element (from 17.7 to 17.3). Thus, the ring pressing amount "b" becomes slightly smaller than that of the 9-layer element (from 5.345 to 4.913).

Regarding the die stress generated when punching these elements (the 9-layer element, and the elements A, B, D, and E), the die stress of the element A is 725 [MPa], which is 53% larger than that of the 9-layer element, and is too large for practical use. The die stress of the element B is 669 [MPa], which is 41% larger than that of the 9-layer element, but can be used practically. The respective die stresses of the elements D and E are even smaller. In particular, the die stress of the element E is 554 [MPa], which is 16% larger than that of the 9-layer element. The element E is thus the most preferable in terms of production.

Figures 4A, 4B:
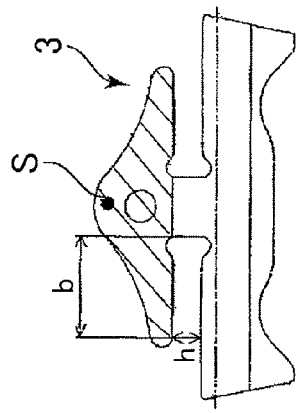
FIG. 4A is a table showing various elements.
FIG. 4B is a diagram showing an element.

FIG. 4A is a table showing comparison among various elements including the above elements ((1) corresponds to the element B, (2) corresponds to the element E, and (3) corresponds to the element A). Of the element types shown in this table, "24/6 B," for example, indicates that the element width on the pitch line is 24 mm, the ring is a 6-layer ring, and the head thickness is increased as in the above prototype element B. The numeral before "/" indicates the width on the pitch line, and the numeral after "/" indicates the number of ring layers. "VDT" is an element made by Van Doorne's Transmissie, and "HONDA" is an element made by Honda Motor Co., Ltd. Note that the slot width "h," the head area "S," and the ear length "b" are defined as shown in FIG. 4B, and the plate thickness "t" is the plate thickness of the element 3.

Figure 2A:
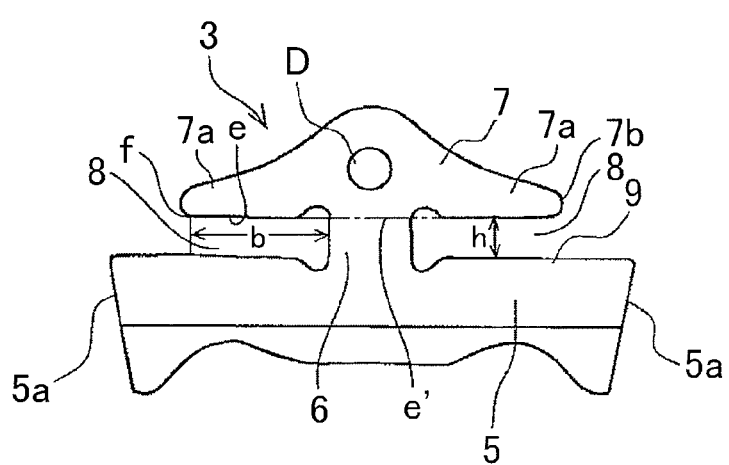
FIG. 2A is a front view of an element of the endless metal belt.
Figure 2B:
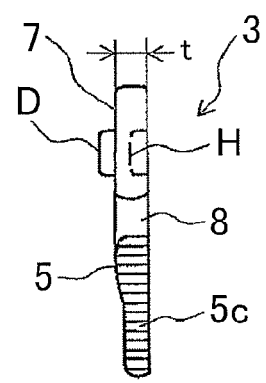
FIG. 2B is a side view thereof.

"h/t," "b/h," and "S/h" were used as indices for determining if the elements are proper or not. Note that the dimensions of the above indices are defined as follows (see FIGS. 2A and 2B). The slot width "h" is a clearance between a lower surface e of the ear 7a and the saddle (surface) 9. The plate thickness "t" of the element is the plate thickness of the head 7. The head area "S" is the area of a region on the head side of the line connecting the respective lower surfaces e, e' of the ears 7a, 7a (hereinafter sometimes referred to as the "ear lower surfaces"). The ear length "b" is the length from an end f on the ear lower surface side of the curve of the ear end 7b (an intersection f between the curve and the straight line), to a side end face of the pillar 6, or the distance from a terminal end f on the ear lower surface side of the curve of the ear end to the bottom of the slot.

When the number of ring layers is reduced (e.g., from nine to six), the slot width "h" is reduced accordingly. If the slot width "h" becomes smaller than the plate thickness "t" of the element ((h/t)<1.0), the working force sharply increases when punching the slot portion of the element, according to the principles of small hole piercing. As a result, the die stress of the slot portion sharply increases, whereby die cracks tend to be generated. However, it was found that, by increasing the head volume (area) S, a restriction by a material can be reduced, whereby the hydrostatic pressure on the receiving side (the element head portion) is reduced, and the load on the die is reduced.

Analysis of the correlation between S/h and the die stress showed that, even the elements of (h/t<1) can be successively continuously produced if S/h is larger than 40 (S/h>40).

Figure 5:
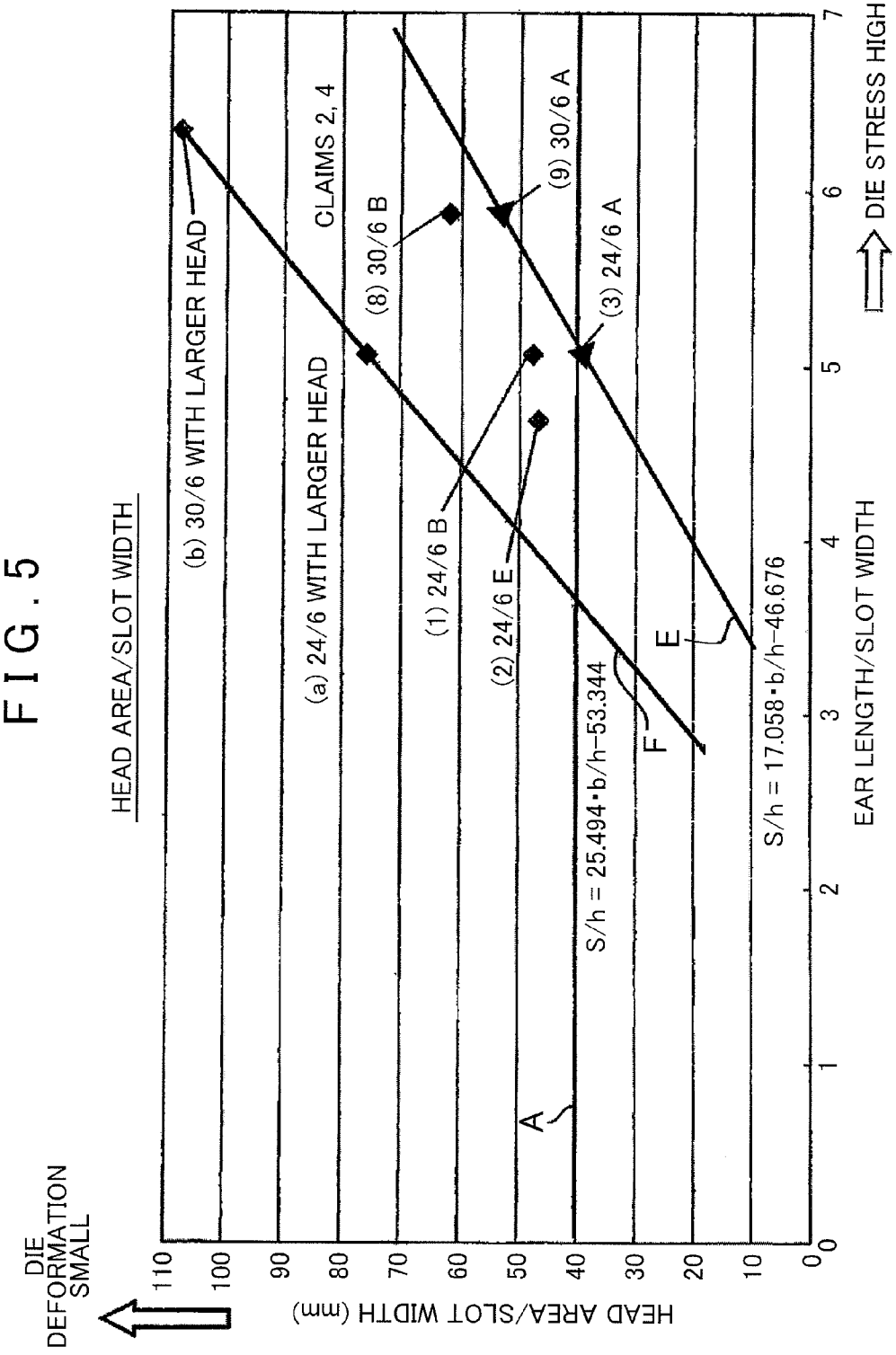
FIG. 5 is a graph showing the relation among the elements, where the ordinate indicates head area (S)/slot width (h), and the abscissa indicates ear length (b)/slot width (h)

FIG. 5 is a plot of the values of the elements, where the abscissa indicates "b/h" (ear length/slot width), and the ordinate indicates "S/h" (head area/slot width). Note that (a) "24/6 with larger head" and (b) "30/6 with larger head" are elements designed to analyze element functions (mainly the influence on pitching caused by raising the center of gravity), which will be described below.

Figure 6:
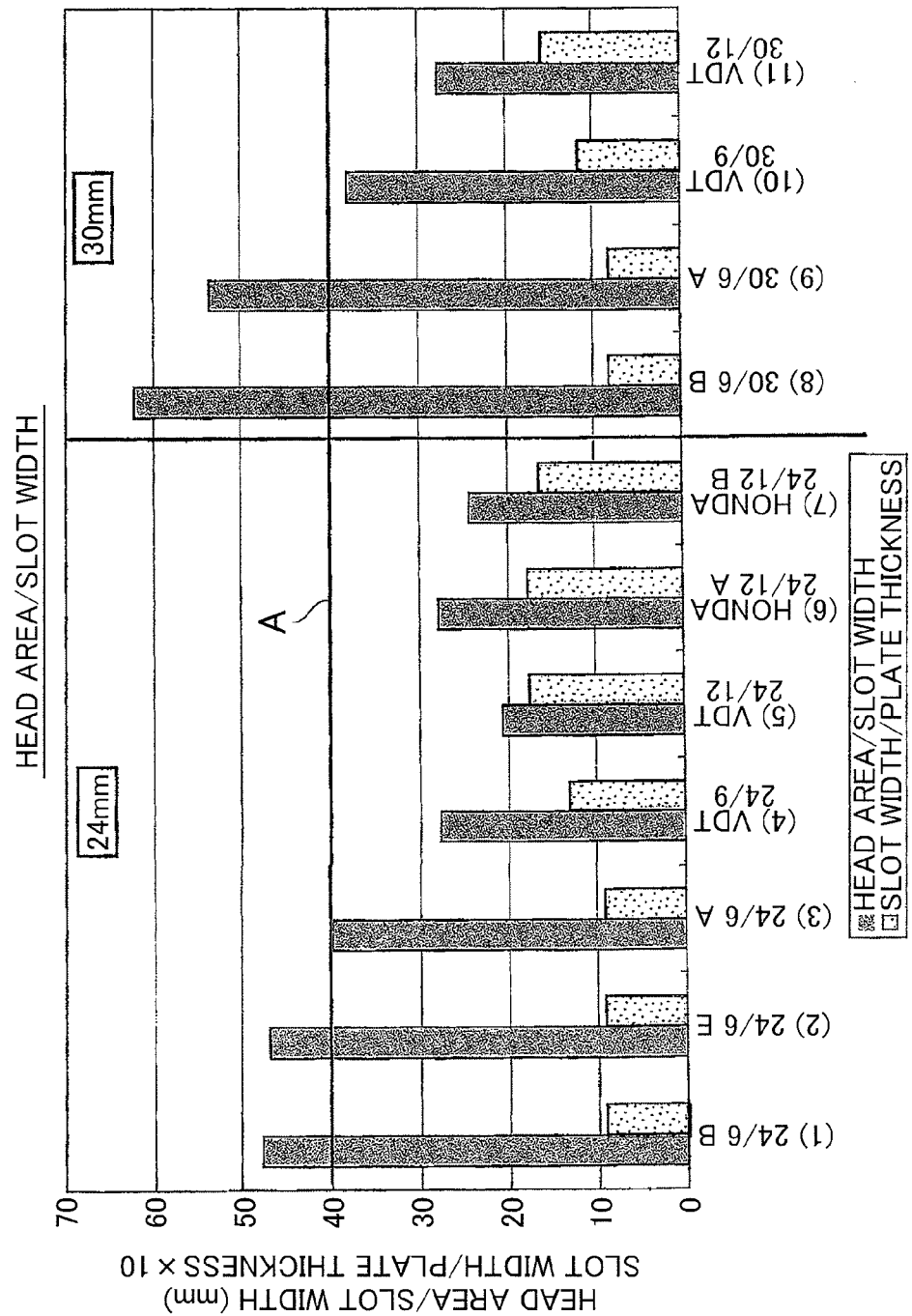
FIG. 6 is a graph showing the head area (S)/slot width (h) and the slot width (h)/plate thickness (t) of the elements.

FIG. 6 is a graph showing the values of "head area (S)/slot width (h)," and "slot width (h)/plate thickness (t)×10" of the various elements. In FIGS. 5 and 6, the elements whose "S/h" is larger than line A are elements that are acceptable in terms of the die stress when h/t<1.

Figure 7:
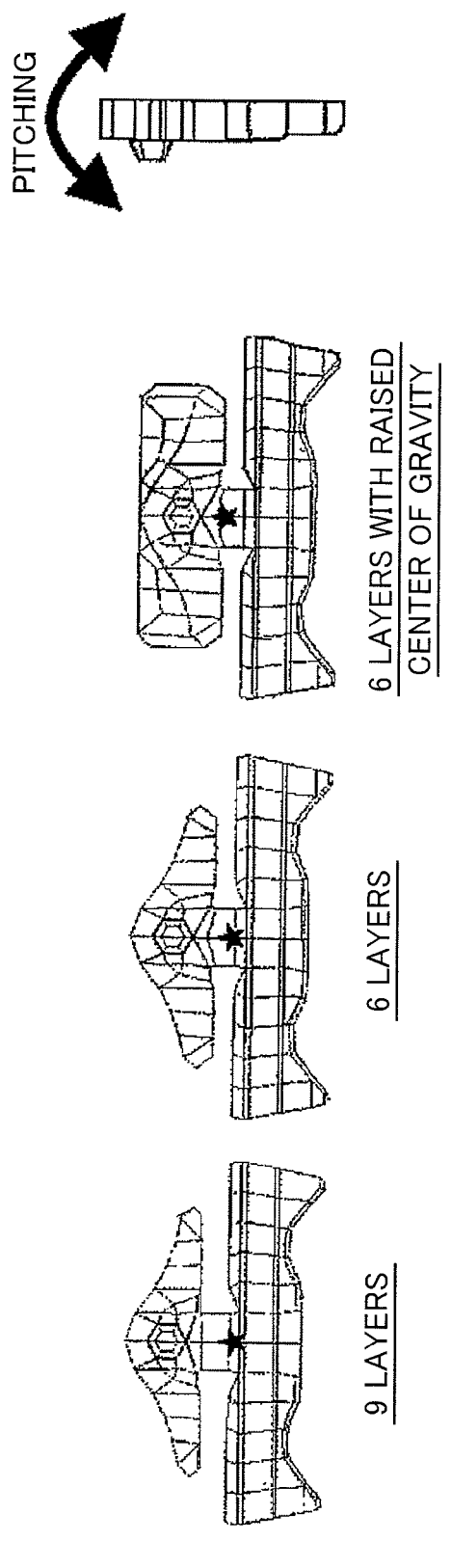
FIG. 7A is a diagram showing the center of gravity of a 9-layer element.
FIG. 7B is a diagram showing the center of gravity of a 6-layer element.
FIG. 7C is a diagram showing the center of gravity of a 6-layer element with an increased head area.
FIG. 7D is a diagram showing pitching.
Figure 8:
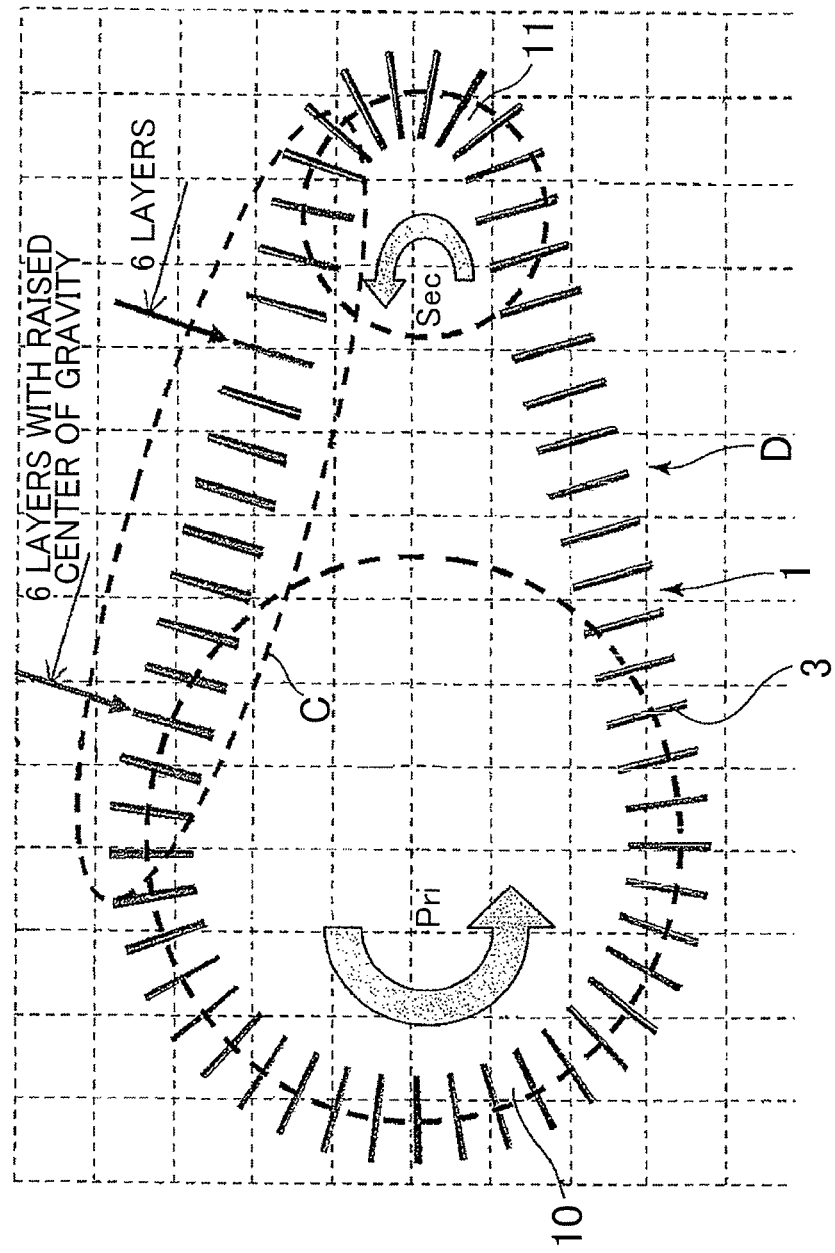
FIG. 8 is a diagram showing traveling simulation for analyzing pitching of endless metal belts using the elements of FIGS. 7A to 7D.

FIGS. 7 and 8 show diagrams illustrating the influence on pitching caused by changing the center of gravity. FIG. 7A shows the 9-layer element shown in FIG. 3A, FIG. 7B shows the 6-layer element E, and FIG. 7C shows an element of CAD analysis, in which the head area has been increased in order to raise the center of gravity. FIG. 7D shows pitching of the element. FIG. 8 is a diagram showing traveling simulation of the metal belts using each element. In FIG. 8, after leaving a primary pulley 10, the metal belt 1 travels to a secondary pulley 11 while compressing the elements 3. After being wound around the secondary pulley 11, the metal belt 1 leaves the secondary pulley 11, and returns to the primary pulley 10 with the compressive force on the elements being released on the slack side (the upper side C in FIG. 8). Thus, the torque of the primary pulley 10 is transmitted to the secondary pulley 1 via the compressive force that is applied to the elements restricted by the ring 2.

At this time, the compressive force is applied to the elements on the compression side (the lower side D in FIG. 8) of the metal belt 1 so that the elements closely contact each other. Thus, no pitching is generated on the compression side. However, since the elements are not compressed together on the slack side C, pitching is generated on this side. Thus, the slack side C is a region where pitching is generated. In the region C, each element is tangentially thrown away after leaving the secondary pulley 11, whereby pitching is generated. However, the higher the position of the center of gravity is, the more time it takes for pitching to settle. In the 6-layer element (see FIG. 7B), pitching settles when the element travels slightly away from the secondary pulley 11. However, in the 6-layer element with a raised center of gravity (see FIG. 7C), pitching settles approximately when the element starts contacting the primary pulley 10, or after the element contacts the primary pulley 10.

That is, the higher the center of gravity is, the slower the pitching of the element settles. Thus, the above simulation result shows pitching of the element settles in the following order: the 9-layer element<the 6-layer element<<<the 6-layer element with a raised center of gravity. In the 6-layer element with a raised center of gravity, pitching of the element continues on the slack side C of the metal belt, and is suppressed almost forcibly when the element contacts the primary pulley 10. This hinders a power transmission function of the metal belt. Note that, in the elements of (h/t<1) that are acceptable in terms of the metal stress, S/h<110 is preferable for the following reason. As the head area S is increased, the center of gravity of the element is raised, and thus, the centrifugal force tends to be increased, and pitching tends to be generated.

Figure 9:
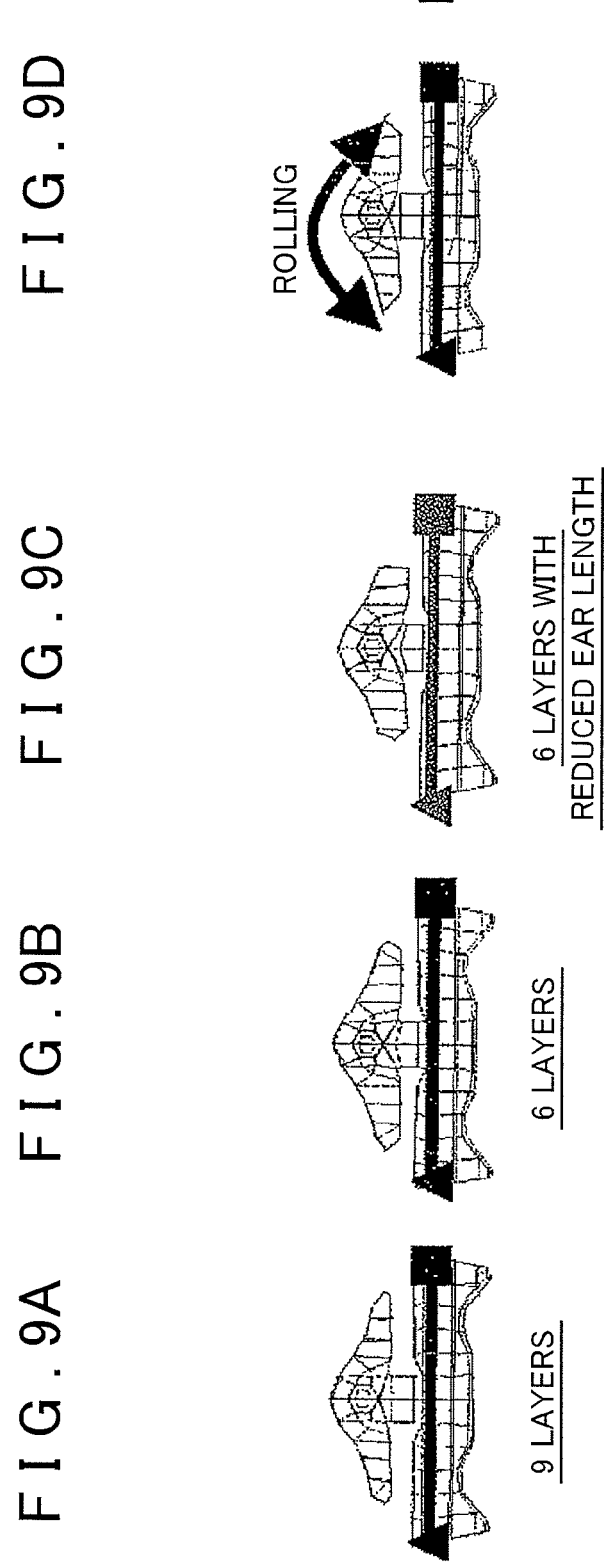
FIG. 9A is a diagram showing rolling of a 9-layer element.
FIG. 9B is a diagram showing rolling of a 6-layer element.
FIG. 9C is a diagram showing rolling of a 6-layer element with a reduced ear length.
FIG. 9D is a diagram showing rolling.
Figure 10:
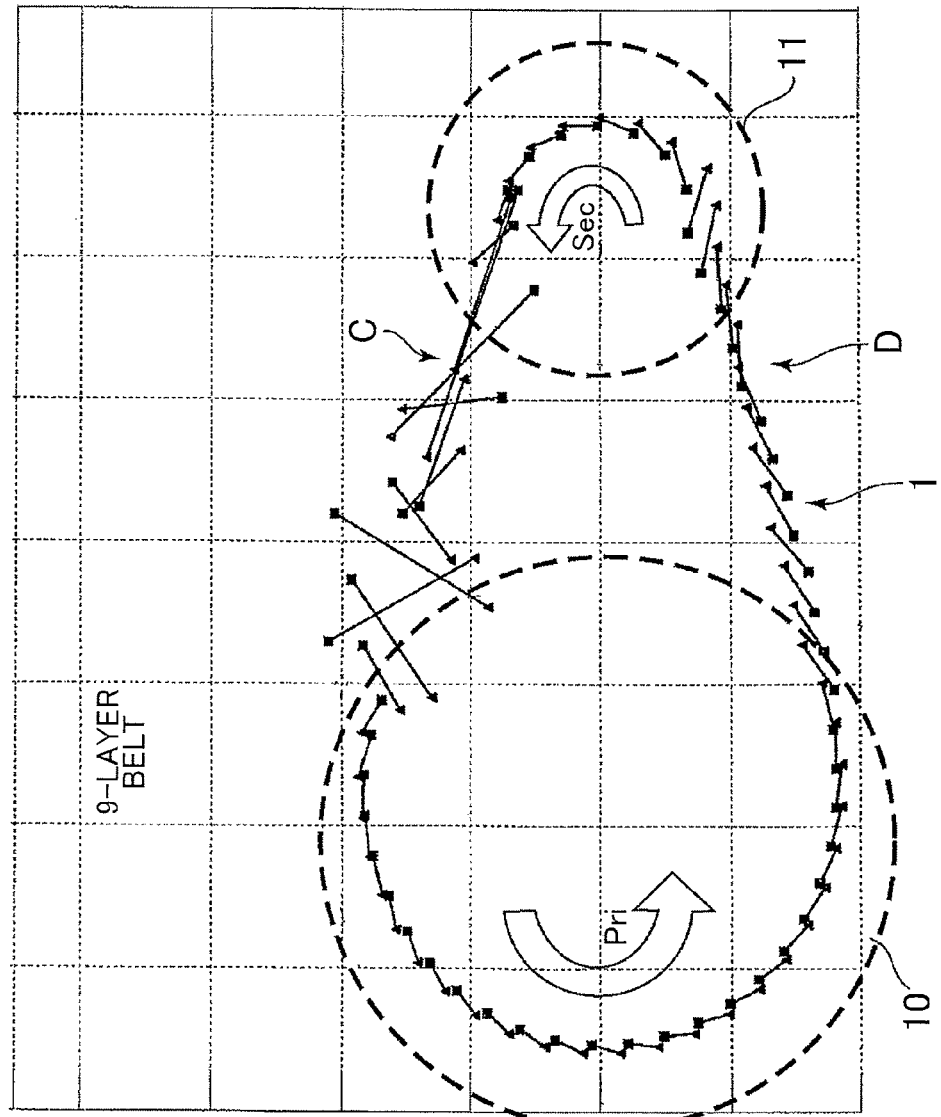
FIG. 10 is a diagram showing traveling simulation for analyzing rolling of endless metal belts using a 9-layer element.
Figure 11:
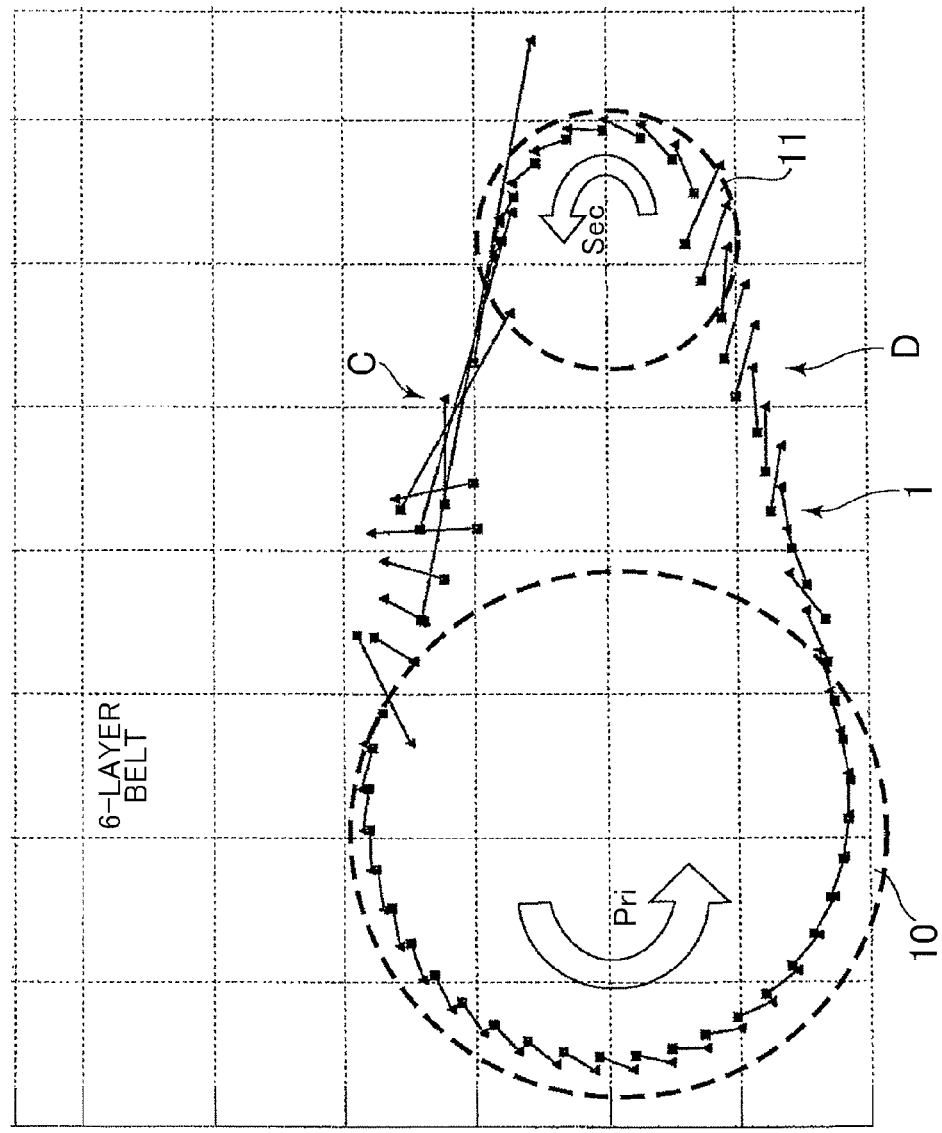
FIG. 11 is a diagram similar to FIG. 10 for analyzing rolling of a 6-layer element.
Figure 12:
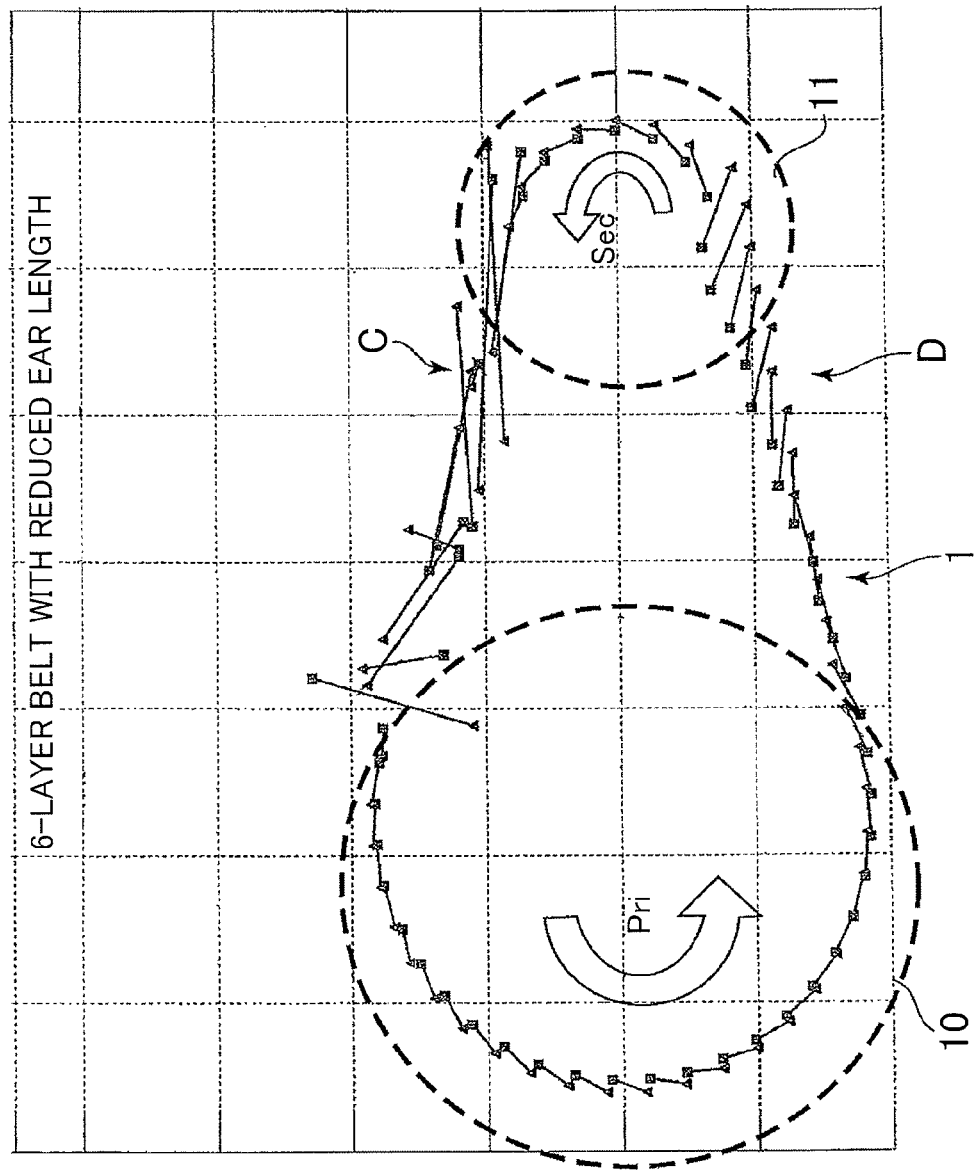
FIG. 12 is a diagram similar to FIG. 10 for analyzing rolling of a 6-layer element with a reduced ear length.

The influence on rolling of the element by the ear length of the element will be analyzed below with reference to FIGS. 9 through 12. FIG. 9A shows the 9-layer element described above, FIG. 9B shows the 6-layer element E, FIG. 9C shows an element that is the same as the element of FIG. 9B except that the ear length is reduced, and FIG. 9D shows rolling. FIGS. 10 through 12 are diagrams obtained by analyzing rolling of each element in the state where the metal belts 1 formed by the above elements are wound around the primary pulley 10 and the secondary pulley 11 for power transmission. FIG. 10 shows the 9-layer element of FIG. 9A, FIG. 11 shows the 6-layer element of FIG. 9B, and FIG. 12 shows the element with a reduced ear length shown in FIG. 9C.

In FIGS. 10 through 12, since the elements are not compressed together on the slack side C, rolling is necessarily generated on the slack side C. Such rolling on the slack side C does not cause any significant problem in terms of the functions. On the other hand, the compression side D directly relates to power transmission, and a large degree of rolling of the elements on the compression side D becomes a factor that hinders smooth power transmission. Comparison among FIGS. 10 through 12 shows that rolling on the compression side is small in the 9-layer belt of FIG. 10, and the degree of rolling is sequentially increased in order of the 6-layer belt of FIG. 11 and the 6-layer belt with a reduced year length of FIG. 12 (the 9-layer belt<the 6-layer belt<the 6-layer belt with a reduced ear length).

Figure 13C:
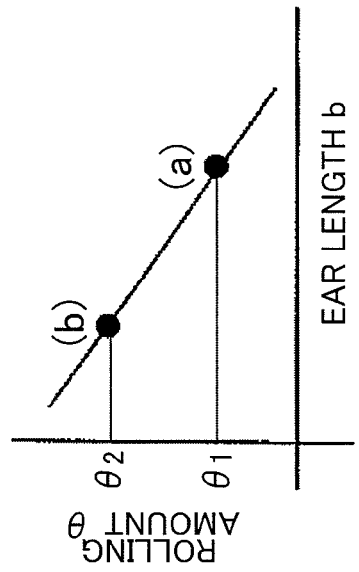
FIG. 13C is a schematic graph showing the relation between the ear length and the rolling amount.
Figure 13B:
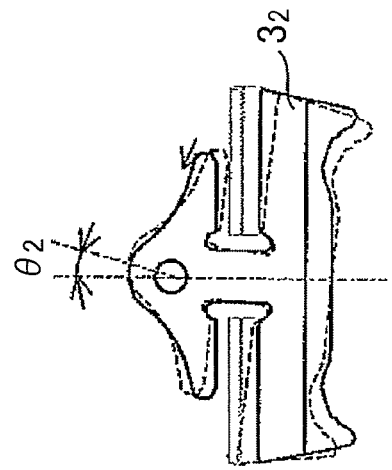
FIGS. 13A and 13B are diagrams showing the rolling amount of an element.
Figure 13A:
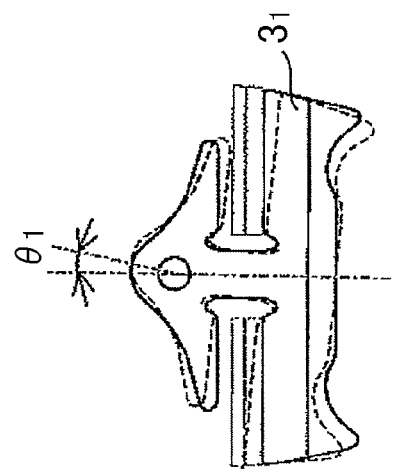

That is, as the ear length becomes shorter, the ear tip end 7b and the ring 2 become less likely to contact each other, and the rolling amount is increased, resulting in reduction in durability of the metal belt. FIGS. 13A to 13C schematically shows this relation. An element $3_1$ having a long ear length shown in FIG. 13A has a small rolling amount $\theta_1$, and an element $3_2$ having a relatively short ear length shown in FIG. 13B has a large rolling amount $\theta_2$. Thus, the elements $3_1$ and $3_2$ have a relation shown in FIG. 13C. Note that the ear length b needs to be long enough so that at least half of the ring width is pressed. Thus, the ear length b needs to be at least half (½) of the width of the ring 2.

Thus, it is preferable that S/h be in the range above the line connecting (9) "30/6 A" and (3) "24/6 A" in FIG. 5 as shown by the following expression (E), and be larger than 40 as described above.

$$S/h=17.058\cdot(b/h)-46.676 \tag{E}$$

That is, it is preferable that $(S/h)>17.058\cdot(b/h)-46.676$ and $(S/h)>40$.

Moreover, FIG. 5 shows (a) 24/6 with a larger head, and (b) 30/6 with a larger head, that is, elements whose body width on the pitch line is 24 [mm] or 30 [mm], and which has a slot width (h) for 6-layer belts. In these elements, the head area has been increased as shown in FIG. 7C so as to raise the center of gravity. If S/h is larger than the line connecting (a) and (b) in FIG. 5 as shown by the following expression (F), pitching is generated, which is not preferable in terms of the functions.

$$S/h=25.494\cdot(b/h)-53.344 \tag{F}$$

Thus, it is preferable that S/h be smaller than the expression (F).

That is, it is preferable that $(S/h)<25.494\cdot(b/h)-53.344$, $(S/h)>40$, and $(S/h)>17.058\cdot(b/h)-46.676$. Moreover, it is preferable that the ear length (b) be at least half of the ring width.

In general, the endless metal belt 1 is formed in an endless shape by attaching substantially 400 elements 3 to the ring 2. Of substantially 400 elements, about 200 elements engage with the primary pulley 10 and the secondary pulley 11, and about 100 elements are present in each of the linear portions (the compression side D and the slack side C) between the pulleys. After being formed by fine blanking, the elements 3 have been deburred by barrel processing, but have not been subjected to a process of adjusting their plate thickness, such as a process of polishing the element surface. Thus, the elements 3 have slightly different plate thicknesses from each other, and representative values of such elements 3, obtained from respective lots as an average of ten elements, vary in a predetermined range centered about 0 [mm], and the elements are combined and attached so that the sum of every 100 elements falls within a predetermined range.

Figure 14:
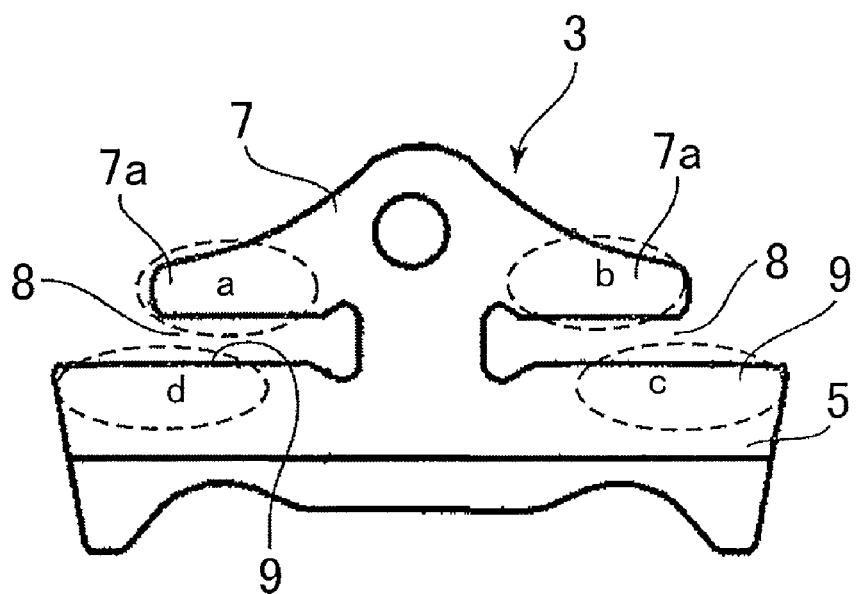
FIG. 14 is a front view showing parts of an element where the plate thickness is to be measured.

The following values of the element 3 used for the above 6-layer ring 2 are measured as shown in FIG. 14: the plate thickness of parts a, b of the left and right ears 7a of the head 7; and the plate thickness of left and right parts (the saddles 9) d, c respectively located adjacent to the slots 8 in the upper part of the body 5 (the plate thicknesses of these parts are respectively shown by "a," "b," "c," and "d"). Based on the measurement, the plate thickness difference between the upper and lower parts of the element is calculated by $[(a+b)/2]-[(c+d)/2]$. If the plate thickness difference is positive (+), it means that the head (the head portion) is thicker than the upper part of the body. If the plate thickness difference is negative (−), it means that the head (the head portion) is thinner than the upper part of the body.

Figure 15:
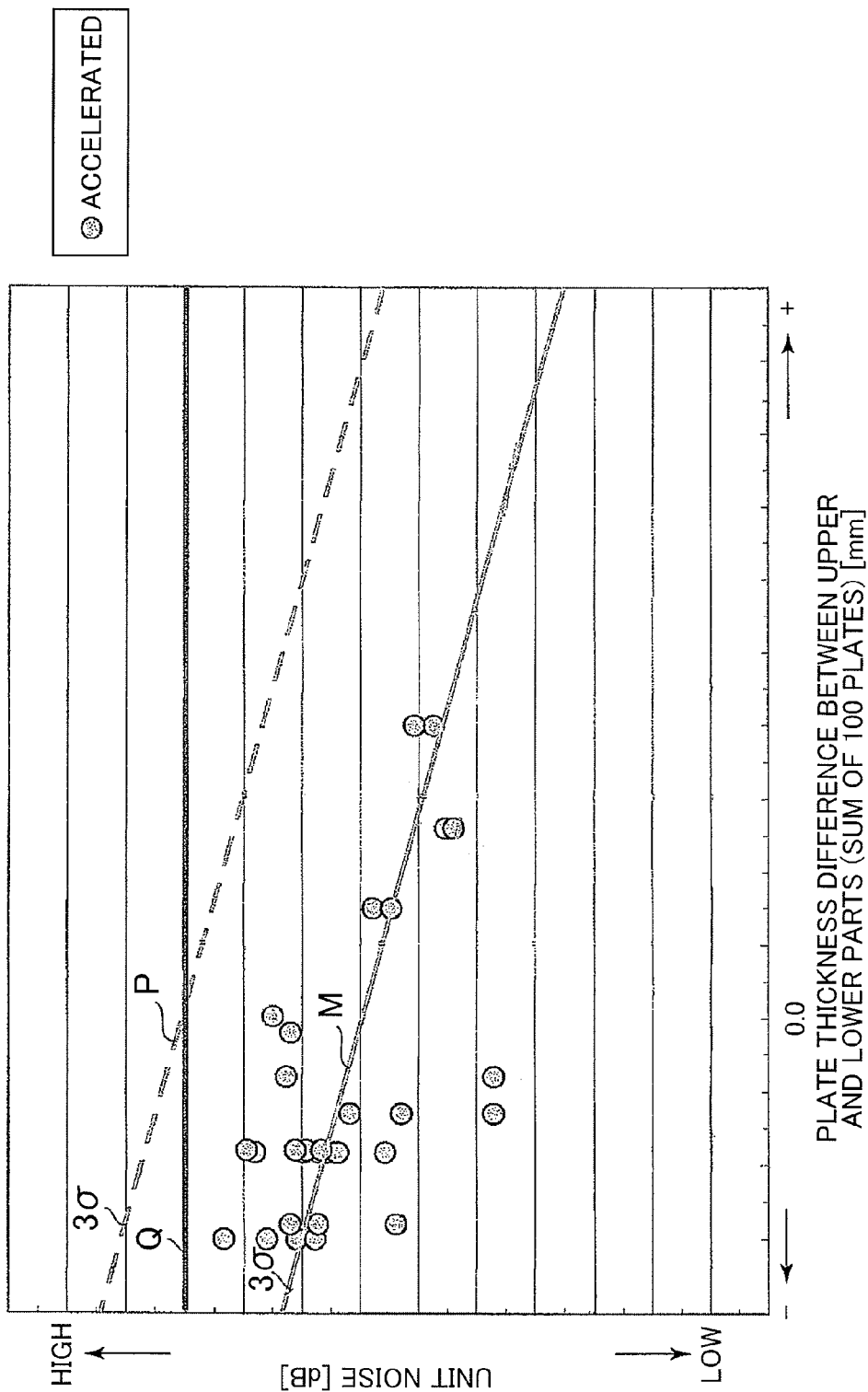
FIG. 15 is a graph showing the relation between noise and the plate thickness difference between upper and lower parts.

FIG. 15 is a plot of units, where the abscissa indicates the sum of the respective plate thickness difference between the upper and lower parts of 100 elements, and the ordinate indicates noise [dB] generated when the endless metal belts (the units) having each plate thickness difference were operated. ○ indicates an accelerated state. The "accelerated state" as used herein refers to the state where a vehicle is accelerated.

As can be seen from FIG. 15, the 6-layer element tends to have lower noise when the plate thickness difference between the upper and lower parts is positive (+), and solid line M in the upper part of the graph is a line connecting the respective centers of distribution of the units in the accelerated state, and broken line P in the upper part of the graph is a line of 3σ in the accelerated state. In practical applications, the 3σ line becomes predetermined noise Q or less when the plate thickness difference between the upper and lower parts in the accelerated state is positive (+), and the plate thickness difference between the upper and lower parts may have any value larger than 0 [mm].

As the plate thickness difference increases, the head portion becomes too heavy, whereby pitching and/or rolling is more likely to occur due to the centrifugal force, which is not preferable.

Figure 16:
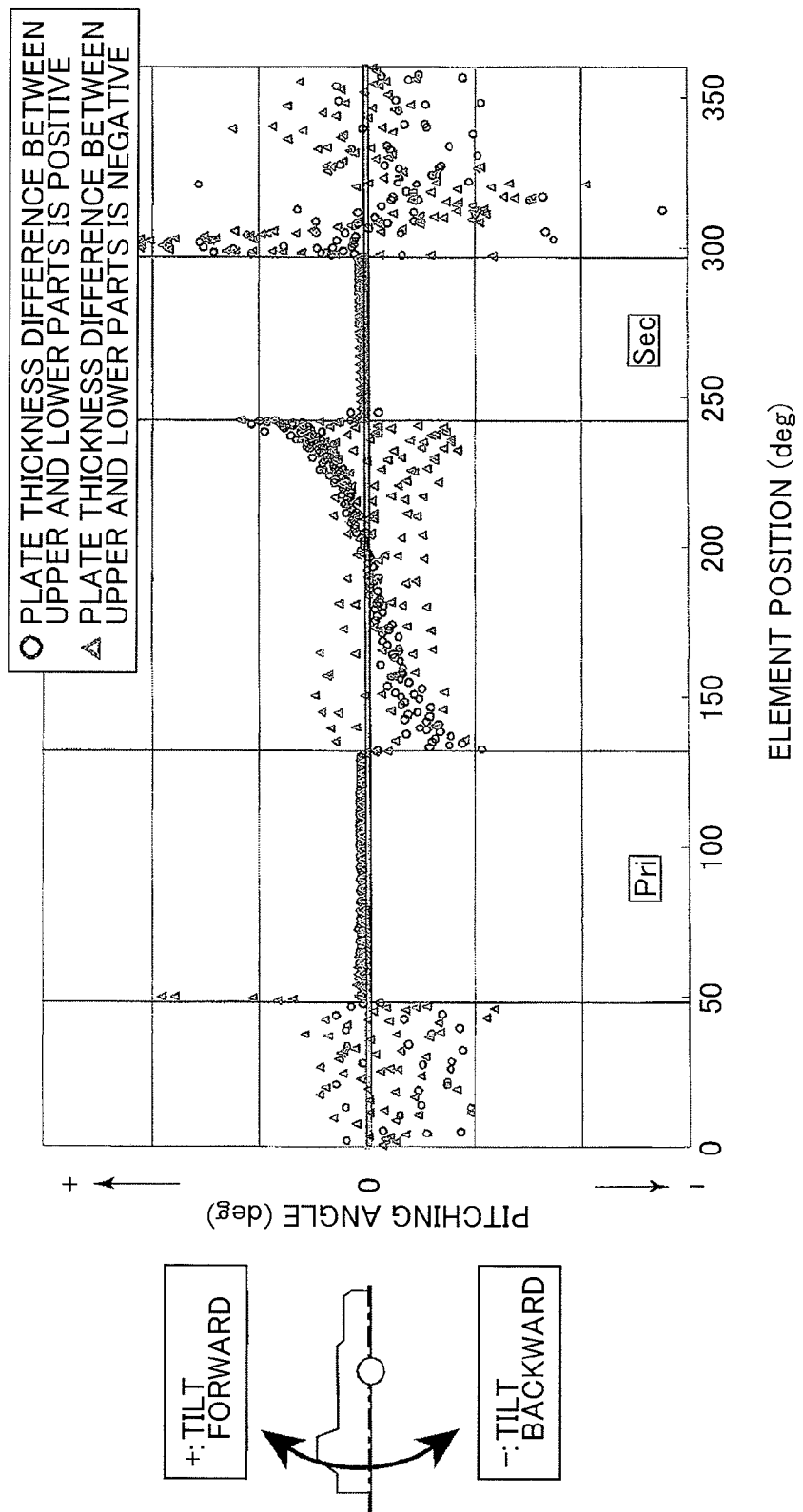
FIG. 16 is a graph showing a pitching angle at each element position.

FIG. 16 is a diagram showing the analysis result of the pitching angle of the element at each position in the state where the endless metal belt is wound on the primary pulley and the secondary pulley and operated. Note that the pitching angle of the element is an angle to the pulley axis when the element is located on each pulley, and is an angle about the intersection between the central axis connecting both pulley axes and the vertical line from the pitch line of each element, when the element is located between the pulleys. The angle is positive (+) when the pitching occurs in the direction forward of the traveling direction of the belt (when the element tilts forward), and is negative (−) when the pitching occurs in the direction rearward of the traveling direction of the belt (when the element tilts rearward). ○ indicates a unit using elements having a positive plate thickness difference between the upper and lower parts, and Δ indicates a unit using elements having a negative plate thickness difference between the upper and lower parts.

At a position (Pri) where each element is wound around the primary pulley and in contact therewith, and a position (Sec) where each element is wound around the secondary pulley and in contact therewith, the pitching element of each element is held at about 0° regardless of the plate thickness difference between the upper and lower parts. On the slack side where the elements move from the secondary pulley to the primary pulley, the elements are in a free state, and have various pitching angles.

On the compression side where the elements move from the primary pulley to the secondary pulley, the elements are compressed together, and the pitching is restricted. An element having a positive plate thickness difference between the upper and lower parts (see ○ in the figure) is tilted in the negative direction, that is, in the rearward direction, on the side where the element leaves the primary pulley. The pitching angle of the element becomes zero in the middle between the pulleys. Then, the element is increasingly tilted in the positive direction, that is, in the forward direction toward the secondary pulley. Every element having a positive plate thickness difference between the upper and lower parts behaves in this manner in every region. On the other hand, the elements having a negative plate thickness between the upper and lower parts (see Δ in the figure) are dispersed in every region.

Figures 17A, 17B:
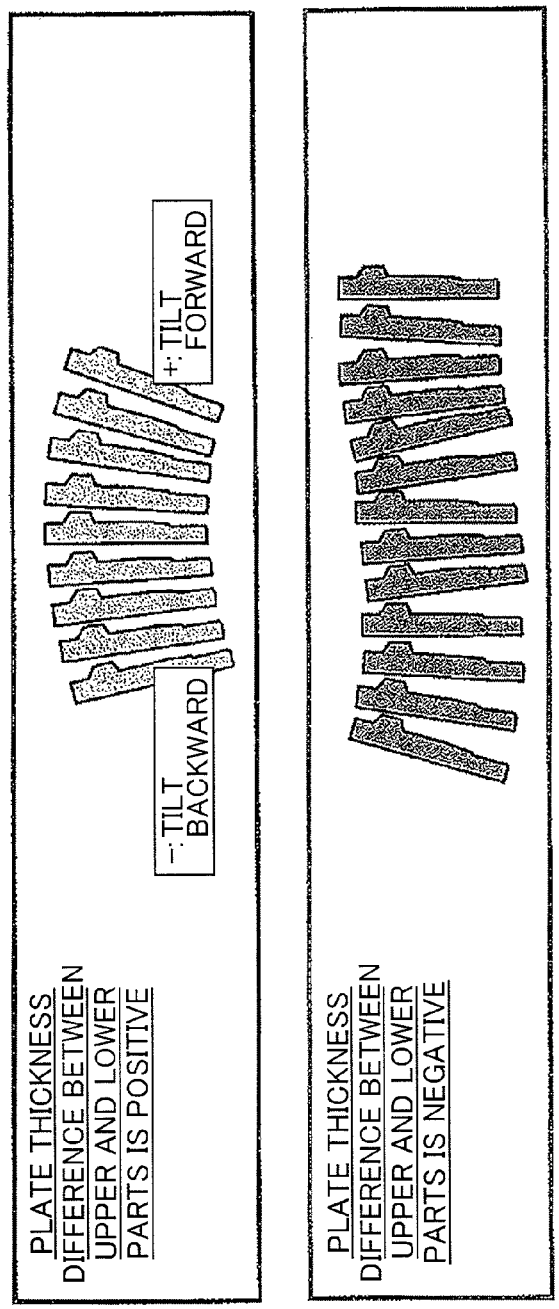
FIG. 17A is a side view showing the posture of each element on the compression side in the case where the plate thickness difference between upper and lower parts is positive.
FIG. 17B is a side view showing the posture of each element on the compression side in the case where the plate thickness difference between upper and lower parts is negative.

The reason for this is as follows. As shown in FIG. 17A, the elements having a positive plate thickness difference between the upper and lower parts change from a rearward tilted state to a forward tilted state on the compression side, and thus, are arranged in an arc shape in every region. This suppresses generation of noise resulting from string vibration or the like. Moreover, the elements leave the primary pulley and start engaging with the secondary pulley both in an orderly manner, whereby generation of noise is suppressed. On the other hand, as shown in FIG. 17B, the elements having a negative plate thickness difference between the upper and lower parts are oriented in various directions even on the compression side, whereby string vibration is generated in the linear portions. Moreover, the elements are not aligned when leaving the primary pulley, and when starting engaging with the secondary pulley, resulting in generation of noise.

The present invention relates to endless metal belts for use in belt-type continuously variable transmission apparatuses, and the belt-type continuously variable transmission apparatuses are used as transmission apparatuses that are mounted on automobiles, for shifting power of a power source such as an engine, and transmitting the shifted power to wheels.

The invention claimed is:

1. An endless metal belt, comprising:
   a pair of rings formed by laminating a plurality of endless metal plates; and
   a multiplicity of elements continuously attached to the ring, wherein
   each of the elements has a body, a head connected to the body by a pillar, and slots formed between the body and the head on left and right sides of the pillar, respectively, for receiving the respective rings, and
   the elements satisfy (h/t)<1 and (S/h)>40 mm,
   where h is a width of the slots, t is a plate thickness of the elements, and S is an area of the head.

2. The endless metal belt according to claim 1, wherein the elements further satisfy (S/h)>17.058 mm·(b/h)− 46.676 mm,
   where b is an ear length of the head, which corresponds to a length from a lower side of a curved outside surface of the head to a side end face of the pillar.

3. The endless metal belt according to claim 2, wherein the elements further satisfy (S/h)<25.494 mm·(b/h)− 53.344 mm,
   where b is an ear length of the head, which corresponds to a length of a part of the slot which can contact the ring.

4. The endless metal belt according to claim 2, wherein the ear length is at least half of a width of the ring.

5. The endless metal belt according to claim 1, wherein the elements have a width on a pitch line of 24 mm and the ring is formed by laminating six endless metal plates.

6. The endless metal belt according to claim 1, wherein the elements are combined and attached to the ring so that a sum of the elements in a linear portion becomes such that a plate thickness of the head becomes larger than a plate thickness of an upper part of the body.

* * * * *